UNITED STATES PATENT OFFICE.

EDWIN HAWKER, OF LEE, ASSIGNOR TO CORNELIUS HANBURY, OF LONDON, ENGLAND.

IMPROVEMENT IN CONFECTIONERY.

Specification forming part of Letters Patent No. 166,365, dated August 3, 1875; application filed November 23, 1874.

*To all whom it may concern:*

Be it known that I, EDWIN HAWKER, of Lee, in the county of Kent, England, have invented an Improvement in the Manufacture of Jujubes and other Gum-Confections, of which the following is a specification:

My invention relates to a certain small class of goods, which may be properly called sticky sweetmeats or gum-confections, the most important portion of which is that known as jujubes. Jujubes are composed of boiled gum and sugar, with flavoring materials, and are a manufactured article, not a natural product. Jujubes (and to a less extent the other class of goods included) are, when manufactured, of a sticky character. Jujubes adhere so strongly together that, when kept for a few weeks in a damp place, they partially melt or dissolve into an adherent mass. On the other hand, when jujubes are kept exposed to the open air for some months, they become hardened, owing to the gum and sugar drying. No decomposition of any kind appears to take place. The change seems to be simply gain of moisture from the air, or loss of moisture to the air.

The stickiness of these gum-confections, thus causing them to adhere in a mass, has rendered it necessary to pack them in tins in order to preserve them—moreover, being liable to get dull on the surface, they were therefore unsightly, and consequently unsalable.

A considerable quantity of such confectionery is for this reason frequently returned to the manufacturer by the retail venders, whereby much loss is incurred.

By means of my invention I am enabled to avoid these defects, besides securing other important advantages, as hereinafter enumerated.

My invention consists, first, in coating jujubes, or gum-confections of all kinds, whether in the sheet, cut, or pastille form, or other sticky confectionery, with a solution of gelatine or isinglass, (fish gelatine,) the coating being applied by dipping the goods manufactured in the ordinary way into the said solution, and placing them on a suitable stand to dry.

My invention relates, secondly, to a new article of manufacture, the same consisting of jujubes or gum-confections coated with a solution of gelatine or isinglass, (fish gelatine.)

By the application of this coating the jujubes and other goods are no longer liable to adhere, and are rendered both in appearance and consistency unalterable from age. Moreover, an economy in the cost of manufacture is effected, and the quality of the goods greatly improved, inasmuch as the jujubes require less boiling, and can be put into the market in a much softer state than hitherto by reason of the protective coating, which prevents them sticking together. They are thus enabled also to retain their full flavor, which has heretofore been in great part lost, owing to the excessive boiling necessary to harden the jujubes sufficiently to render them salable.

Besides these advantages (tins need not be used as packages by the retail venders) there is no loss of weight from age, the goods have a better appearance, they do not dull on the surface, and can be boxed the same day they are made. They are prevented from adhering or absorbing water, or loss of water.

In carrying out my invention I do not confine myself to the use of either gelatine or isinglass, (fish gelatine,) but in combination, if found desirable, I may even add such other ingredient as may enhance the appearance or quality of the goods.

The following is claimed as new and of my invention:

1. The process herein described of coating jujubes and other sticky confections in a solution of gelatine or isinglass, (fish gelatine,) substantially as and for the purpose set forth, to prevent adhesion or absortion of water or loss of water.

2. Jujubes or gum-confections, having a coat of gelatine or isinglass, (fish gelatine,) substantially as herein described.

The above specification of my invention signed by me this 2d day of October, in the year of our Lord one thousand eight hundred and seventy-four.

EDWIN HAWKER.

Witnesses:
    FREDERIC MARTEN,
        *2 Plough Court, Lombard St., E. C.*
    ALFRED BASTIN,
        *Plough Court, Lombard St.*